United States Patent [19]

Schiltz

[11] Patent Number: 5,392,368
[45] Date of Patent: Feb. 21, 1995

[54] PROCESS FOR MOUNTING AN OPTICAL COUPLING OF AN OPTICAL FIBER ON A SUBSTRATE AND SUBSTRATE EQUIPPED WITH AN OPTICAL FIBER

[75] Inventor: Andre Schiltz, Saint-Ismier, France
[73] Assignee: France Telecom, Paris, France
[21] Appl. No.: 989,067
[22] Filed: Dec. 11, 1992

[30] Foreign Application Priority Data

Dec. 12, 1991 [FR] France ................ 91 15445

[51] Int. Cl.⁶ .................................. G02B 6/42
[52] U.S. Cl. ............................... 385/14; 385/24
[58] Field of Search .................... 385/14, 24, 31, 39

[56] References Cited

U.S. PATENT DOCUMENTS

| | | | |
|---|---|---|---|
| 3,967,877 | 7/1976 | Heidrich et al. | 385/49 |
| 4,130,343 | 12/1978 | Miller et al. | 385/49 |
| 4,465,333 | 8/1984 | Caserta et al. | 385/73 |
| 4,865,407 | 9/1989 | Suzuki et al. | 385/31 |
| 4,872,739 | 10/1989 | Kahn et al. | 385/24 |
| 4,890,895 | 1/1990 | Zavracky et al. | 385/14 |
| 4,916,497 | 4/1990 | Gaul et al. | 385/14 |
| 4,989,934 | 2/1991 | Zavracky et al. | 385/14 |
| 4,991,179 | 2/1991 | Deppe et al. | 372/45 |
| 5,011,249 | 4/1991 | Diaz | 385/14 |
| 5,054,870 | 10/1991 | Lösch et al. | 385/14 |
| 5,163,113 | 11/1992 | Melman | 385/31 |

FOREIGN PATENT DOCUMENTS

0192850 9/1986 European Pat. Off. ..... H01L 31/02

OTHER PUBLICATIONS

Patent Abstract from JP 2297989, published Dec. 10, 1990, as cited in Patent Abstracts of Japan, vol. 15, No. 78 (E-1037), Feb. 22, 1991.
Patent Abstract from JP 1307707, published Dec. 12, 1989, as cited in Patent Abstracts of Japan, vol. 14, No. 104 (P-101), Feb. 26, 1990.

*Primary Examiner*—Frank Gonzalez
*Attorney, Agent, or Firm*—Jefferson Perkins

[57] ABSTRACT

A process for mounting of an optical fiber (1) on a substrate (2) and for optical coupling between this fiber and an optical or optoelectronic element (17) or component such as a waveguide, a receiver or an emitter formed or carried on the front face (5) by the substrate, consisting in inserting the end of an optical fiber (1) into a through orifice (6) formed in the substrate (2) engaging it by the rear face of the substrate, in sealing the end of the optical fiber in said orifice, and in forming on the path of the optical wave a deflecting facet (18) such that the optical wave originating from the optical fiber is deflected by this facet towards said element or component (17), or vice versa.

8 Claims, 9 Drawing Sheets

PROCESS FOR MOUNTING AN OPTICAL COUPLING OF AN OPTICAL FIBER ON A SUBSTRATE AND SUBSTRATE EQUIPPED WITH AN OPTICAL FIBER

TECHNICAL FIELD

The present invention relates to a process for mounting of an optical fiber on a substrate and for optical coupling of this fiber.

BACKGROUND OF THE INVENTION

In the field of telecommunications, the current trend is towards the replacement of certain coaxial electrical links between electronic equipments by optical links obtained by means of optical fibers placed in an appropriate sheath and interconnecting one or more sources emitting light and one or more photosensors.

The current trend is also towards the utilization of monomode fibers, which exhibit a diameter of approximately ten microns.

In order to effect the mounting of a fiber on a substrate and its optical coupling with an optoelectronic component or photosensor, whether or not via waveguide, various solutions are currently known.

A first solution consists in applying the end portion of the optical fiber onto the front face of the substrate and in retaining it by means of an auxiliary plate which exhibits a V-shaped groove in which this end portion extends.

In a known variant, the end face of the optical fiber is, prior to its mounting, beveled, this beveled end face deflecting the optical wave towards an optoelectronic component. In another known variant, the end face of the optical fiber is coupled axially to a waveguide formed on the substrate.

Another known solution consists in fixing the end of the optical fiber perpendicularly to the substrate, directly on an optoelectronic component or facing such a component through the substrate.

The principal disadvantages of the known solutions reside in the bulkiness of the devices obtained, in the difficulty of disposing in the desired position the optical fiber which exhibits a specified configuration prior to its mounting and in the addition of auxiliary parts for the fixing of the optical fiber.

SUMMARY OF THE INVENTION

The object of the present invention is in particular to remedy at least in part the disadvantages of the known techniques of mounting and of optical coupling of optical fibers on a substrate.

The process according to the invention relates to the mounting of an optical fiber on a substrate and to the optical coupling between this fiber and an optical or optoelectronic element or component such as a receiving or emitting waveguide or optical fiber formed or carried in the front face on the substrate.

According to one object of the invention, the process consists in inserting the end of an optical fiber into a through orifice formed in the substrate, engaging it by the rear face of the substrate, in sealing the end of the optical fiber in said orifice, and in forming on the path of the optical wave a deflecting facet such that the optical wave originating from the optical fiber is deflected by this facet towards said element or component, or vice versa.

According to a preferred embodiment of the invention, the end of the optical fiber is disposed perpendicularly to the substrate and the axes of the optical paths of the optical wave are, upstream and downstream of said deflecting facet, perpendicular to the substrate and parallel to the front face of the latter.

According to a further object of the invention, the process consists in inserting the end of an optical fiber into a through orifice formed in the substrate, engaging it by the rear face of the substrate, in sealing the end of the optical fiber in said orifice, and in depositing on the front face of the substrate a layer of material which covers said orifice and which is intended to form a waveguide and in forming in said layer a deflecting facet such that the optical wave originating from the optical fiber is deflected by this facet towards the waveguide, or vice versa.

According to the invention, the process may advantageously consists in inserting the end of the optical fiber as far as a position such that its end face is disposed in the plane of the front face of the substrate.

According to a further subject of the invention, the process consists in depositing on the front face of the substrate a layer of material, which layer is intended to form an optical guide, in forming an orifice passing through the substrate and at least in part the waveguide, in inserting the end of an optical fiber into said through orifice engaging it in the rear face of the substrate, in sealing the end of the optical fiber in said orifice, and in forming on the path of the optical wave a deflecting facet such that the optical wave originating from the optical fiber is deflected by this facet towards the waveguide, or vice versa.

According to the invention, the process may advantageously consist in inserting the end of the optical fiber as far as a position such that its end face is disposed in the front plane of said layer, said facet being formed at the end of the optical fiber.

According to the invention, the operation of sealing the end of the optical fiber is preferably obtained by introduction of a sealing material filling at least the portion of said orifice situated in the vicinity of the front face of the substrate.

According to the invention, the process preferably consists, before inserting the end of the optical fiber, in cementing an adhesive film at the front face of the substrate, covering said orifice, and, after sealing the end of the optical fiber, in removing the aforementioned film.

According to the invention, the aforementioned orifice is preferably cylindrical.

In a preferred form of the invention, the fiber is preferably disposed perpendicularly to the substrate.

According to the invention, the annular space separating the wall of the optical fiber and the wall of the aforementioned orifice is preferably within the range between 10 and 50 microns.

According to the invention, the process may advantageously consist in covering the deflecting facet with a layer of a reflective material.

According to the invention, the process may likewise consist in forming another deflecting facet at another location of the waveguide, facing an optoelectronic component inserted and sealed in the substrate, this other facet being such that the optical wave originating from the waveguide is deflected by this other facet towards this optoelectronic component, or vice versa.

In one embodiment, the operation of forming the aforementioned deflecting facet may be obtained by etching.

According to a variant, the aforementioned etching operation is effected through a layer of a photosensitive material, which layer is deposited on the aforementioned layer, in which material there is previously formed a profile matched to the profile of the deflecting facet to be formed.

The operation of formation of said deflecting facet or of said profile may advantageously be performed through an adapted photolithographic mask or directly by irradiation.

The subject of the invention is also a substrate equipped with at least one optical fiber and exhibiting on the front face at least one optical or optoelectronic element or component such as a waveguide.

According to the invention, the optical fiber exhibits an end inserted into a through orifice of the substrate by a rear face of the latter and sealed in this orifice by a sealing material, this end of the optical fiber extends perpendicularly to the substrate and a deflecting facet such that the optical wave originating from the optical fiber is deflected by this facet towards the waveguide, or vice versa, is provided in the waveguide and/or the sealing material and/or is formed by the end face of the optical fiber.

BRIEF DESCRIPTION OF THE DRAWINGS

The present invention will be better understood on studying various processes for mounting of optical fibers on substrates and for optical coupling of such fibers, which processes are illustrated diagrammatically, in views which are greatly enlarged, by the drawing, in which.

DETAILED DESCRIPTION

Figure 1:
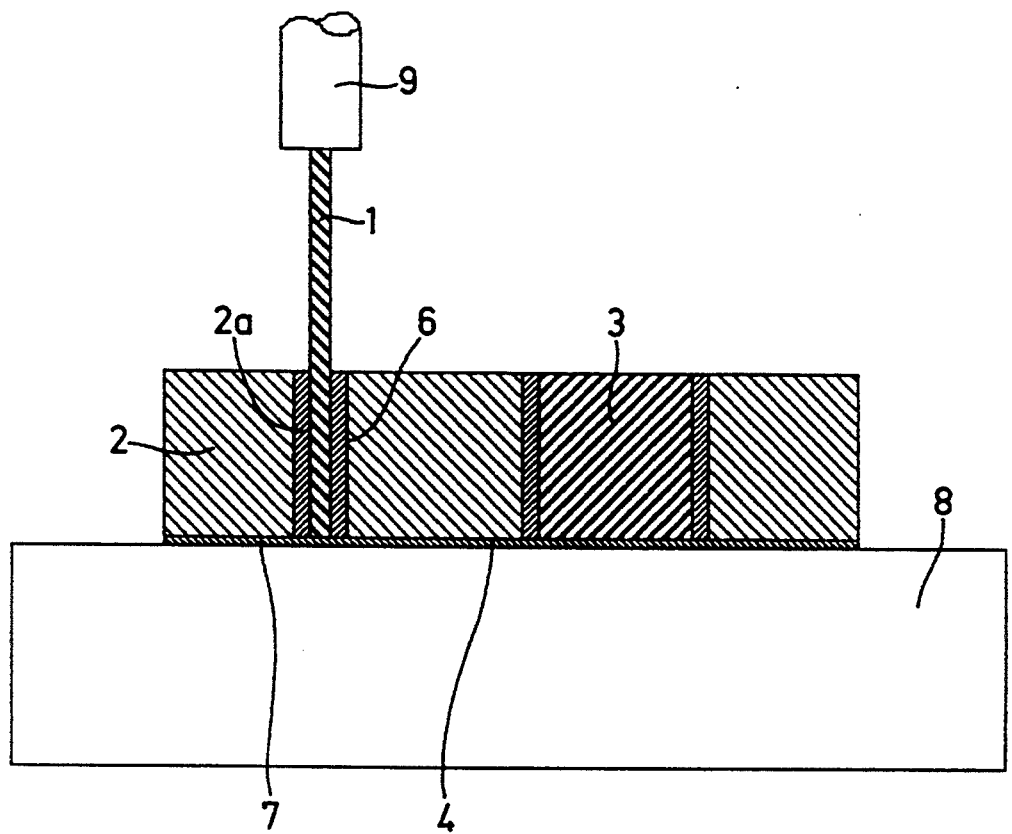
FIGS. 1 to 3 rate the steps of a process according to the invention.
Figure 2:
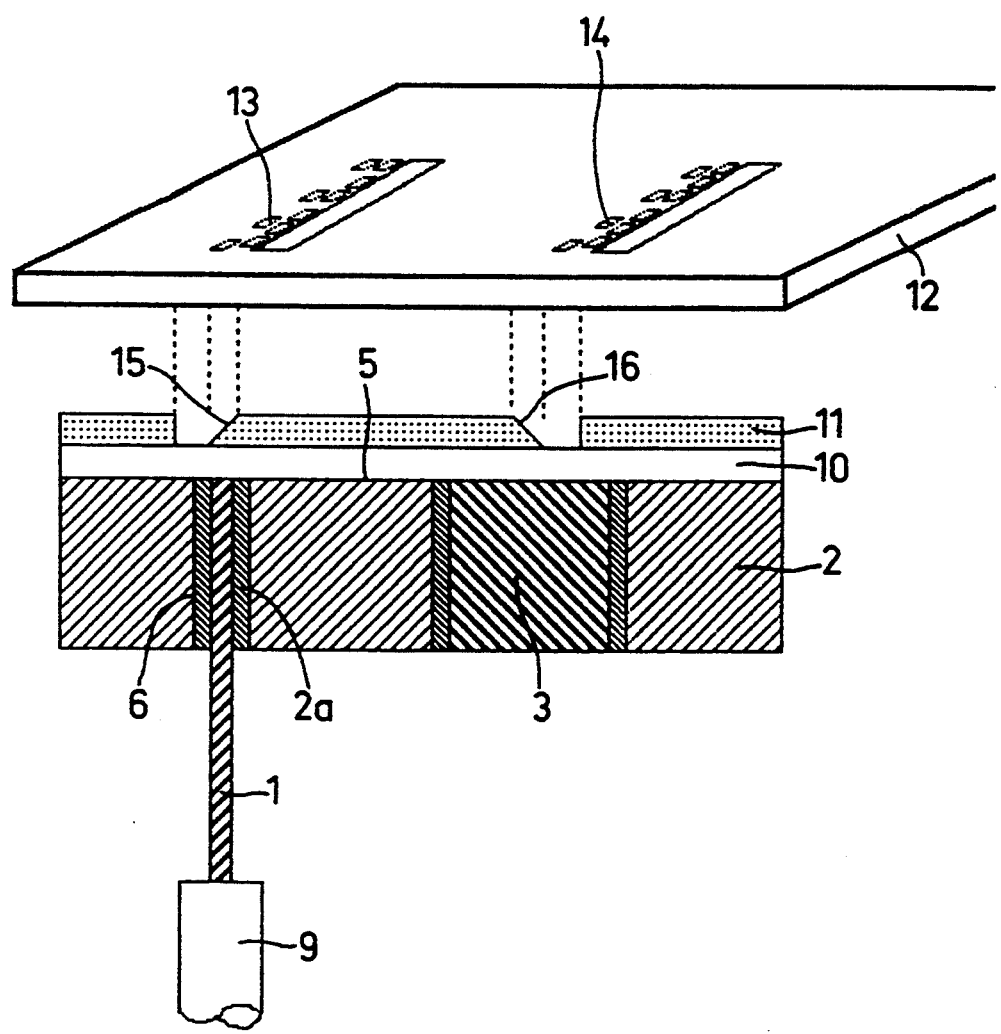
Figure 3:
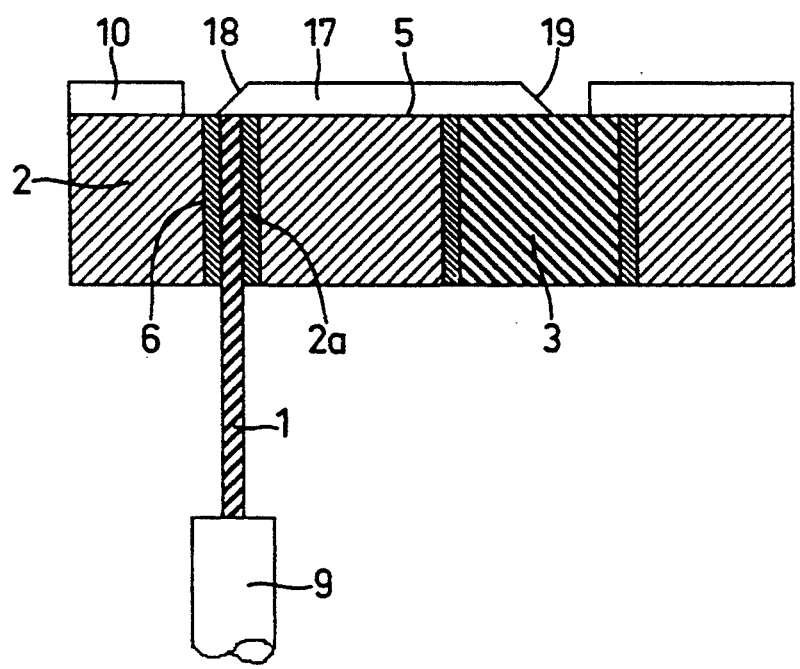

With reference to FIGS. 1 to 3, a description will first of all be given of a first process for mounting of an optical fiber 1 on a substrate 2 in the form of a wafer and for optical coupling of the latter with an optoelectronic component 3 inserted into the substrate 2 in such a manner that its front face 4 extends in the same plane as the front face 5 of the substrate.

First of all, as shown by FIG. 1, a through orifice 6 is formed in the substrate 2, which extends perpendicularly to the front face 4 of the substrate 2. In the example, this orifice 6 is cylindrical and may be obtained by piercing by means of a laser beam. In another variant, this orifice might be obtained by etching by microlithographic definition or KOH etching and might exhibit a conical shape according to an angle of for example 54° its smallest diameter being situated on the side of the front face 5 of the substrate.

Then, an adhesive film 7 is cemented against the front face 5 of the substrate 2 and then this substrate 2 is placed and retained on the plane upper face of a support 8 in a position such that the film 7 extends between the substrate 2 and this support 8.

Then, after having removed the sheath 9 surrounding the end portion of the optical fiber 1, its end is introduced into the cylindrical orifice 6 until its end face is in contact with the film 7.

Then, a sealing material 2a is introduced into the annular space separating the end of the optical fiber 1 and the wall of the orifice 6, the optical fiber 1 exhibiting a diameter within the range between 5 and 100 microns and this space preferably exhibiting a thickness within the range between 10 and 50 microns. This sealing material is preferably constituted by a thermally crosslinkable or photo-crosslinkable fluid adhesive, for example of the epoxide, polyimide or acrylic type, which is at the same time thermostable and optically transparent at the wavelength of the optical wave conveyed by the optical fiber 1.

This sealing material is moreover preferably constituted by an epoxide resin without a solvent, which is fluid and photo-crosslinkable by an ultraviolet radiation in accordance with a mode of ionic polymerization also permitting the hardening of the unexposed zones.

Then, the substrate 2 equipped with the optical fiber 1 is separated from the support 8, and the adhesive film 7 is removed by peeling. The optical fiber 1 is at this point mounted on the substrate 2 and inserted into the latter by its rear face opposite to its front face 5.

As shown by FIG. 2, the substrate 2 is then placed such that its front face 5 is turned upwards.

There is deposited on this front face 5 a layer 10 of a material intended to form an optical waveguide, which is optically transparent at the wavelength of the optical wave conveyed by the optical fiber 1, for example of a dielectric material such as silica or a thermostable transparent polymer.

The material utilized to form the layer 10 may advantageously be identical to that utilized as sealing material to fix the end of the optical fiber 1 in the orifice 6 of the substrate 3.

Then, there is deposited on the layer 10 a thick layer 11 of photosensitive resin, of the photosensitive polyimide or novolac type. Then, with the aid of a photolithographic mask 12 described in particular in French Patent No. 85 17 487 which includes micron patterns 13 and 14 which are disposed facing the optical fiber 1 and the sensitive zone of the optoelectronic component 3, the irradiation of the photosensitive layer 11 through the patterns 13 and 14 of the mask 12 is undertaken in order to form, by virtue of obtaining a luminous intensity decreasing along these patterns, inclined facets 15 and 16 in the photosensitive layer 11.

Then, after having removed the mask 12, the etching of the layer 10 through the layer 11 is undertaken, for example by plasma etching.

As shown by FIG. 3, there is first obtained a waveguide 17 formed in the layer 10, the edges of which may advantageously be formed at the same time. This waveguide 17 exhibits, at its ends, inclined facets 18 and 19 situated respectively facing the end of the optical fiber 1 and the sensitive zone of the optoelectronic component 3. These facets 18 and 19 are such that the optical wave, originating from the optical fiber 1 along a geometric axis perpendicular to the front face 5 of the substrate 2, is deflected by the deflecting facet 18 into the waveguide 17 along a geometric axis parallel to the front face 5 of the substrate 2, and is then deflected by the other deflecting facet 19 to strike the sensitive part of the optoelectronic component 3 perpendicularly to the front face 5 of the substrate 2, or vice versa. In the example, the facets 18 and 19 are formed at 45° in relation to the front face 5 of the substrate 2.

Figure 4:
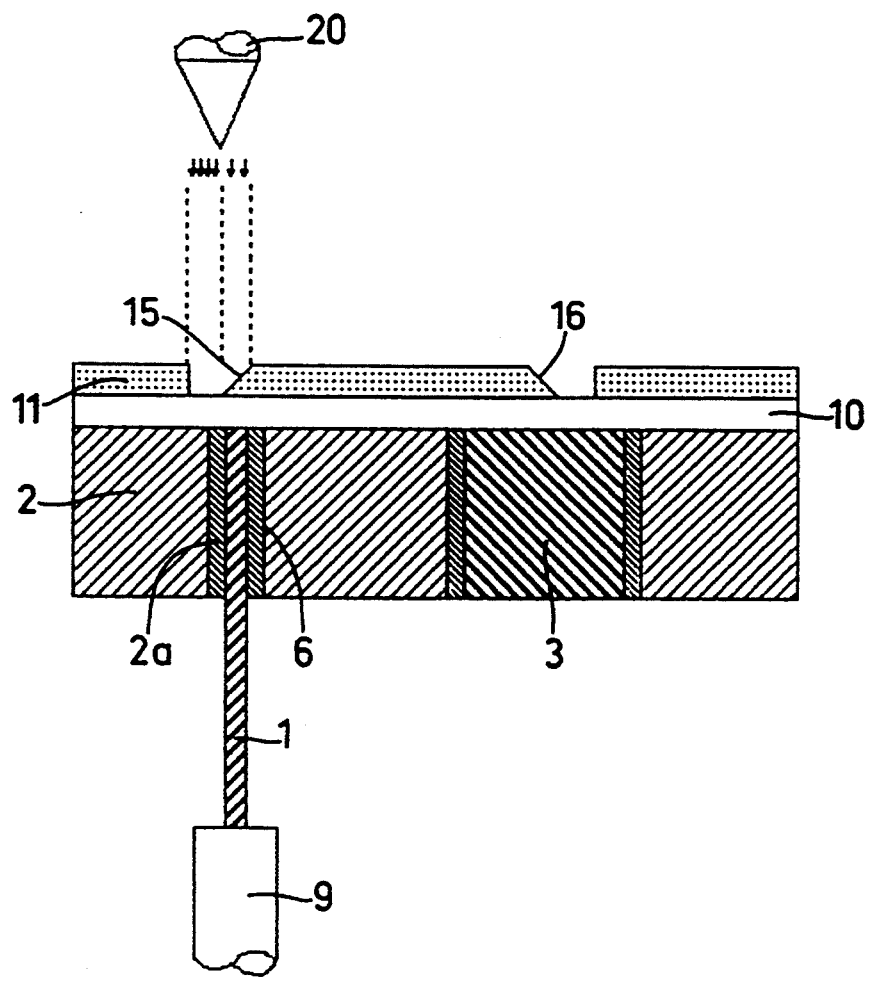
FIG. 4 illustrates a variant of the process according to the invention.

Referring now to FIG. 4, it is seen that instead of utilizing the special mask 12 for the formation of the facets 15 and 16 in the photosensitive layer 11, it is possible to utilize, in a variant, an emitter 20 of a particle beam, for example of an electron beam, to form the facets 15 and 16 by irradiation of the photosensitive layer 11, dosing this irradiation in a decreasing manner.

In another variant, the emitter 20 may be utilized to erode the layer 10 directly in order to form the deflecting facets 18 and 19 in this layer directly, at the ends of the waveguide 17.

Figure 5:
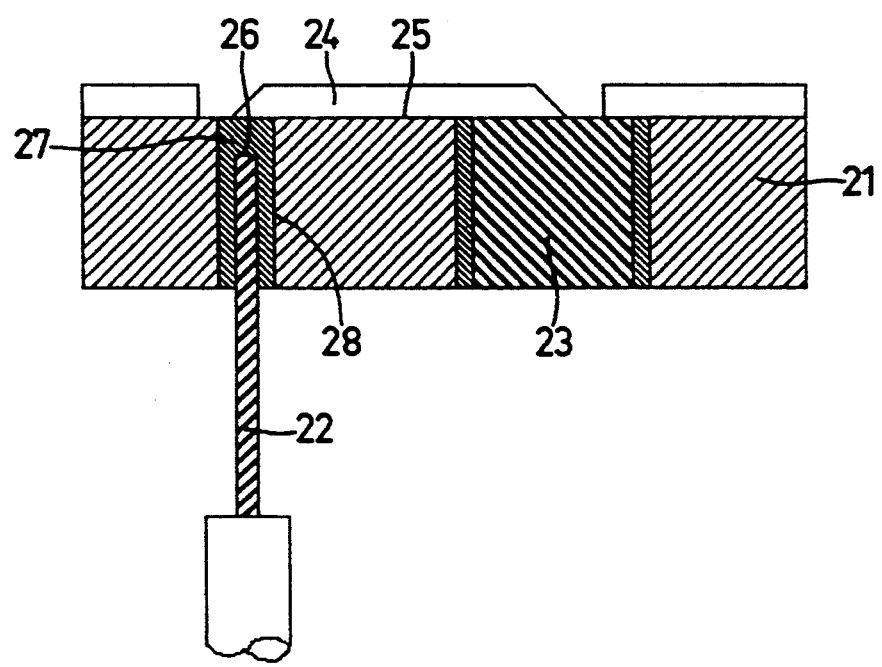
FIG. 5 illustrates another variant of the process according to the invention.

Referring now to FIG. 5, it is seen that a substrate 21 has been shown, which is equipped, as previously, with an optical fiber 22 and with an inserted optoelectronic component 23, which are connected by a waveguide 24 formed in the front face 25 of the substrate 21.

This substrate 21 thus equipped may be formed by following the steps of the process described previously with reference to FIGS. 1 to 4, but differs therefrom by the fact that in the course of the insertion of the end of the optical fiber 22, the end face 26 of the latter is not in the plane of the front face 25 of the substrate 21, but is slightly set back and the sealing material 27 entirely fills the front portion of the orifice 28 in which the optical fiber 22 is inserted, and thus extends between the front face 26 of this optical fiber 22 and the waveguide 24.

Figure 6:
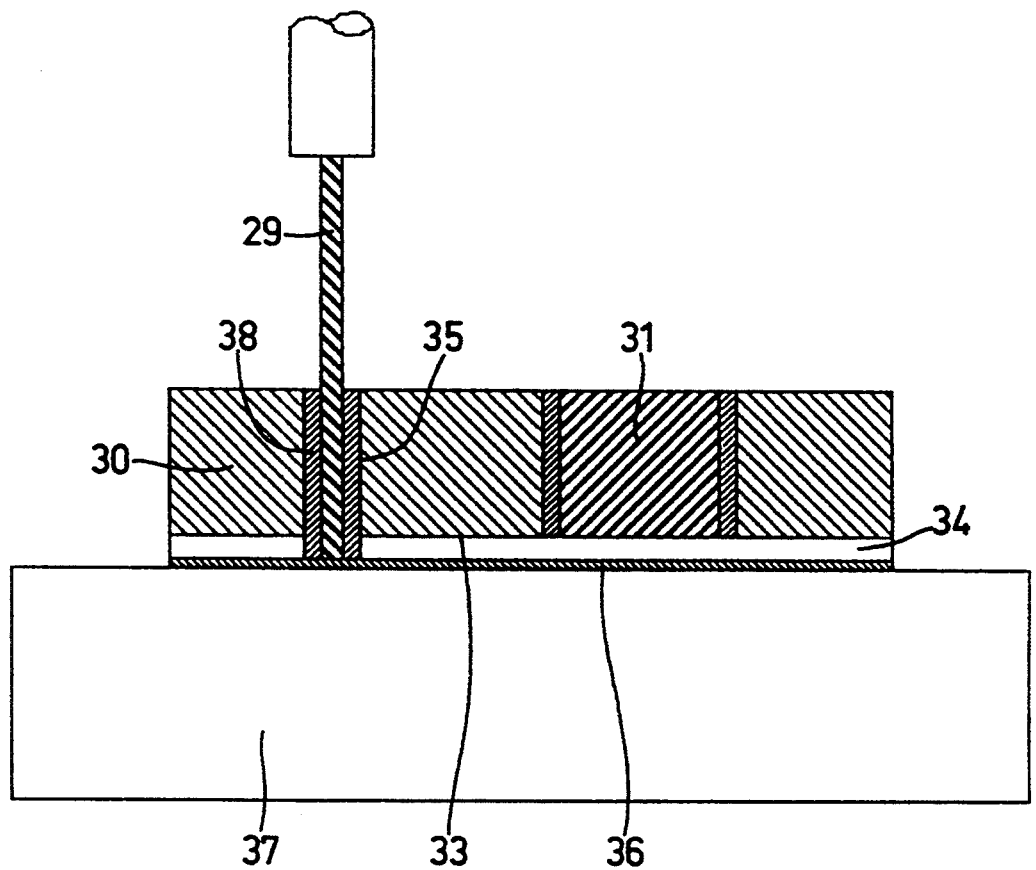
FIGS. 6 and 7 illustrate the steps of another process according to the invention.
Figure 7:
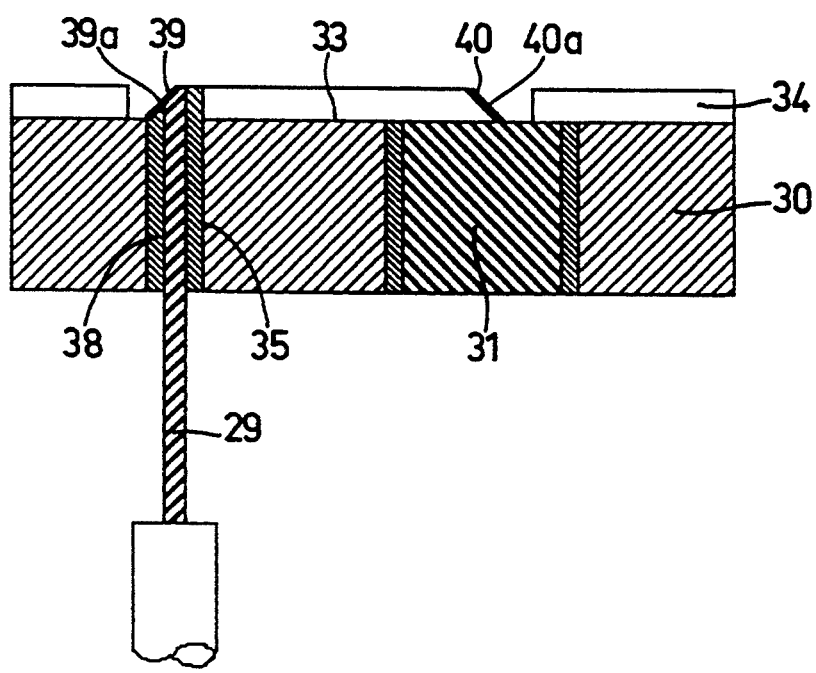

Referring now to FIGS. 6 and 7, a description will now be given of a process for mounting of an optical fiber 29 on a substrate 30 and for optical coupling of the fiber to an optoelectronic component 31 inserted into this substrate 30 in such a manner that, as previously, its front face 32 extends in the plane of the front face 33 of the substrate 30.

As shown by FIG. 6, this other process differs from the previously described processes only in that the layer 34, which is intended to constitute a waveguide, is deposited on the front face 33 of the substrate 30 prior to the insertion of the optical fiber 29.

In fact, since the optoelectronic component 31 is inserted into the substrate 30, the layer 34 is deposited on the front face 33 of the substrate 30.

A cylindrical orifice 35 passing through the substrate 30 and the layer 34 is formed perpendicularly to this front face 33.

An adhesive film 36 is cemented on the layer 34, and the substrate 30 is placed and retained on a support 37, the film 36 being in contact with this support 37.

The end of the fiber 29 is inserted into the orifice 35, and, as previously, it is fixed by introducing a sealing material 38 into the annular space separating the optical fiber 29 and the wall of the orifice 35. The substrate 30 thus equipped is separated from the support 37, and the adhesive film 34 is removed by peeling.

The formation of deflecting facets 39 and 40 is then undertaken, in order to convey the optical wave from the optical fiber 29 towards the optoelectronic component 31, or vice versa, as shown by FIG. 7.

The formation of these facets may be effected in accordance with the steps of the previously described processes. However, on this occasion the facet 39 is formed at the end of the optical fiber 29 if the latter was engaged as far as the frontal plane of the layer 34, or in the sealing material 38 if the end face of the optical fiber 29 has been inserted short of the front face 33 of the substrate 30.

Moreover, the deflecting facets 39 and 40 may be covered with layers 39a and 40a of a reflective material.

Figure 8:
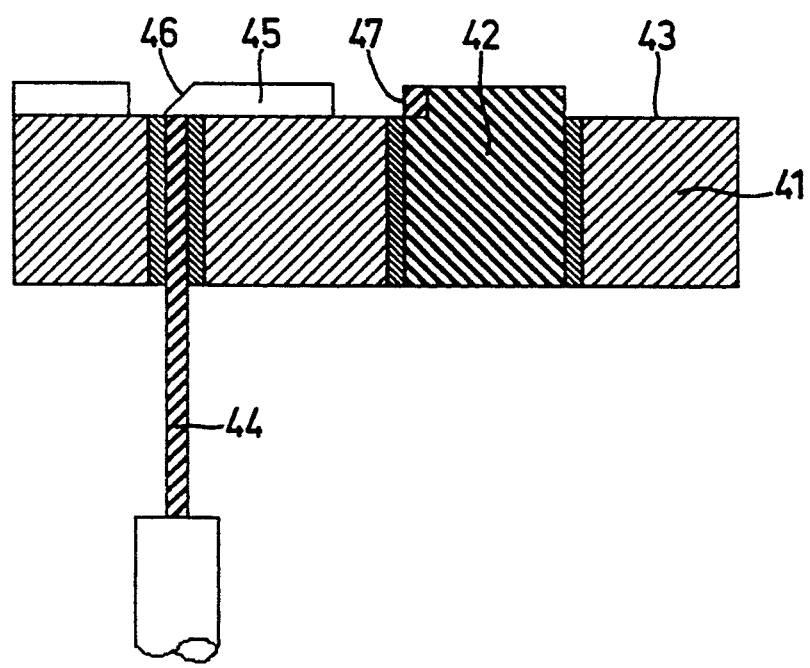
FIGS. 8 and 9 illustrate variants of substrates obtained with the processes of the invention.
Figure 9:
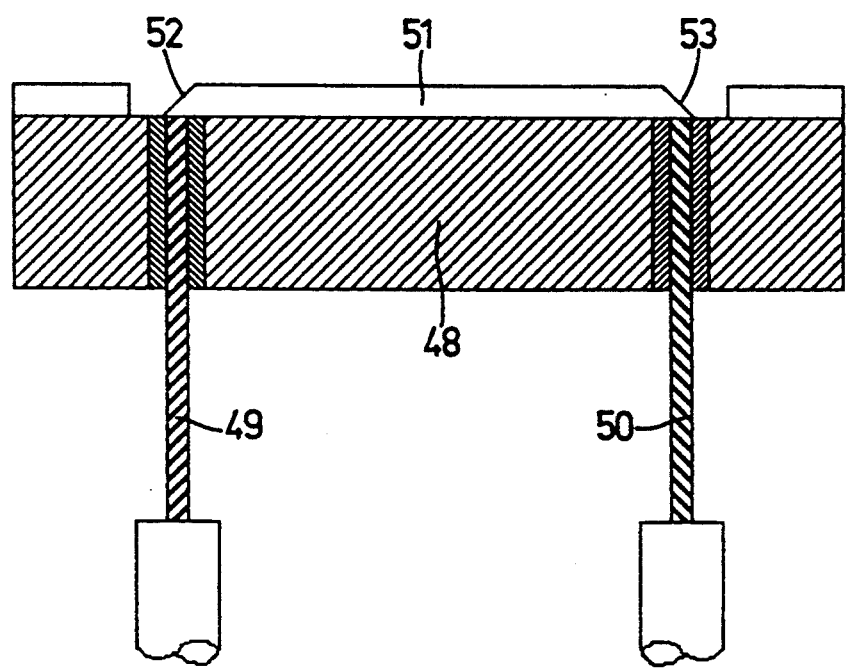

Referring now to FIGS. 8 and 9, a description will now be given of various variants of a substrate equipped with optically coupled optical fibers and utilized in accordance with any one of the previously described processes.

With reference to FIG. 8, it is seen that the substrate 41 carries an optoelectronic component 42 which projects beyond the front face 43 of this substrate, an optical fiber 44 inserted by the rear face of the substrate 41 and a waveguide 45 formed on the front face 43 of the substrate 41. This waveguide 45 exhibits an inclined deflecting face 46 facing the optical fiber 44 and guides the optical waves towards the sensitive lateral face 47 of the optoelectronic component 42. However, in this example, the waveguide 45 is interrupted before this face 47. It might also be interrupted at another location.

Referring now to FIG. 9, it is seen that a substrate 48 is equipped with two optical fibers 49 and 50 which are inserted by the rear face of this substrate 48 and, on its front face, with a waveguide 51 which exhibits two deflecting facets 52 and 53 which are formed facing the optical fibers 49 and 50 in such a manner as to couple the latter optically.

The present invention is not limited to the examples described hereinabove. Many other modified embodiments are possible without departing from the scope defined by the appended claims.

I claim:

1. A process for coupling an optical fiber to an optical component disposed adjacent a first face of a substrate, comprising the steps of:

forming an orifice between a second face of the substrate and the first face;

inserting an end of the optical fiber so that an end face of the optical fiber is disposed in the plane of the first face of the substrate;

forming a layer of material on the first face of the substrate to substantially cover the orifice and to form a waveguide; and forming a deflecting facet above the orifice and on the waveguide such that an optical wave path is formed from the optical fiber to the optical component.

2. A process for coupling an optical fiber to an optical component disposed adjacent a first face of a substrate, comprising the steps of:

forming a layer of material on the first face of the substrate to form a waveguide;

forming an orifice between a second face of the substrate and the first face of the substrate and extending, at least in part, through the waveguide;

inserting an optical fiber into the orifice from the second face toward the first face; and forming a deflecting facet on an end of the optical fiber.

3. The process of claim 2, and further comprising the step of forming the deflecting facet on an end of the optical fiber.

4. A process for coupling an optical fiber to an optical component disposed adjacent a first face of a substrate, comprising the steps of:

forming an orifice between a second face of the substrate and the first face;

inserting the optical fiber into the orifice from the second face towards the first face;

introducing a sealing material filling at least the portion of the orifice situated in the vicinity of the first face of the substrate; and forming a deflecting facet above the orifice such that an optical wave path is formed from the optical fiber to the optical component.

5. A process for coupling an optical fiber to an optical component disposed adjacent a first face of a substrate, comprising the steps of:

forming an orifice between a second face of a substrate and the first face;

cementing an adhesive film on the first face of the substrate to cover the orifice;

thereafter inserting an end of an optical fiber into the orifice from the second face to the first face;

sealing the optical fiber in the orifice;

removing the adhesive film after sealing the optical fiber forming a layer of material on the first face to form a waveguide; and forming a deflective facet over the orifice on the waveguide such that an optical wave path is formed from the optical fiber to the optical component.

6. A process for coupling an optical fiber to an optical device disposed adjacent a first face of a substrate, comprising the steps of:

forming an orifice between a second face of the substrate and the first face;

inserting an optical fiber into the orifice from the second face towards the first face;

forming the optical device in a predetermined region of the substrate such that a face thereof is planar with the first face of the substrate;

forming an optical waveguide on the first face to extend from the orifice to the optical device;

forming a first deflecting facet over the orifice to deflect optical waves to and from the optical fiber; and forming a second deflecting facet as a portion of the waveguide and to be disposed over the optical device, such that optical waves will be deflected to and from the optical device.

7. A substrate having coupled thereto an optical fiber, comprising:

a first face of said substrate;

a second face of said substrate opposed to said first face, an orifice formed through the substrate between said first and second faces;

an optical fiber inserted into said orifice from said second face toward said first face;

an optical component formed in said substrate and having a face which forms a portion of said first face of said substrate, said optical component spaced from said orifice in a direction parallel to said first face; and a waveguide formed on said first face and extending from said orifice to said optical component, means for forming a first deflecting facet adjacent said first face, said facet adaptable to complete an optical wave path between said optical fiber and said waveguide, a second deflecting facet formed in said waveguide and adaptable to complete an optical wave path from said waveguide to said optical component, such that an optical wave path is formed between said optical fiber and said optical component.

8. The substrate of claim 7 wherein said optical component is an optoelectronic component.

* * * * *